Jan. 24, 1928.  L. MALLETTE  1,656,982
SPRING CLIP
Filed Dec. 13, 1926
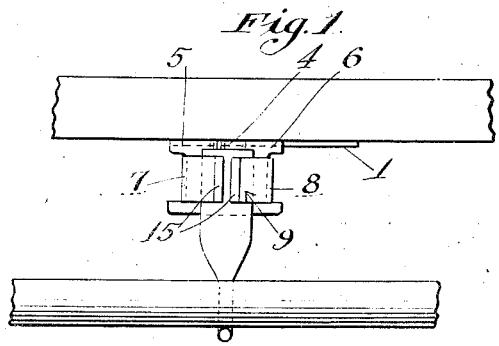
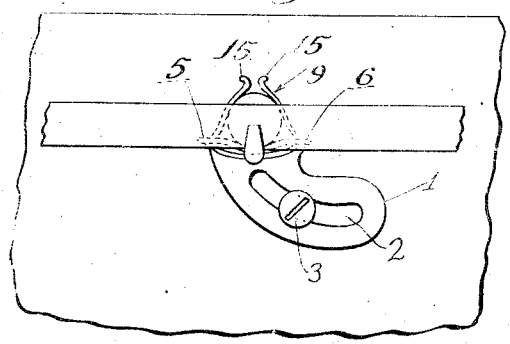
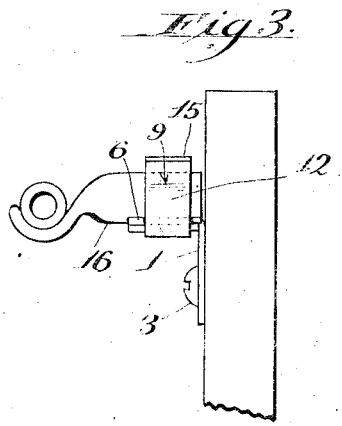
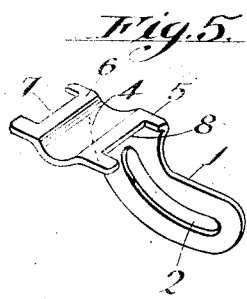
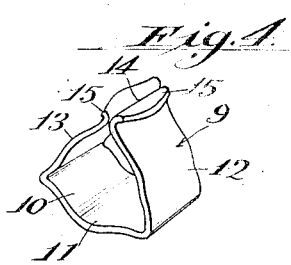
Inventor:
Lyle Mallette
by Hazard and Miller
Attorneys Patented Jan. 24, 1928.

1,656,982

UNITED STATES PATENT OFFICE.

LYLE MALLETTE, OF LOS ANGELES, CALIFORNIA, ASSIGNOR TO CLAUDE NEON LIGHTS, INC., OF NEW YORK, N. Y., A CORPORATION OF NEW YORK.

SPRING CLIP.

Application filed December 13, 1926. Serial No. 154,573.

This invention relates to improvements in spring clips or clamps.

An object of this invention is to provide an improved spring clip or clamp which is of cheap, simple and durable construction and which will effectively hold a suitable article.

With the foregoing and other objects in view which will be made manifest in the following detailed description and specifically pointed out in the appended claims, reference is had to the accompanying drawings for an illustrative embodiment of the invention, wherein:

Figure 1 is a plan view illustrating my invention in applied position,

Fig. 2 is a front view of the improved spring clip in position,

Fig. 3 is a side view of my improved spring clip in position,

Fig. 4 is a perspective view of the actual support used in connection with my spring clip, and Fig. 5 is a perspective view of the actual clip used in connection with my support.

Referring to the accompanying drawings wherein similar reference characters designate similar parts throughout, the improved clip or clamp consists of two parts, one part constituting a supporting member formed of sheet metal having a flat portion 1 in which there is an arcuate slot 2 adapted to receive a screw 3 or similar fastening means whereby the same may be clamped on the side of a wall or the like. The actual supporting surface consists of an arcuate depression which is designated at 4, and extending laterally from the same are a pair of wings 5 and 6 which are in substantial alignment. The arcuate depression 4 and the wings 5 and 6 extend laterally at right angles from the flat portion 1. Each flange is provided with a cut-out portion designated at 7 and 8, which cut-out portions are adapted to receive therein the sides of a spring clip designated as an entirety at 9. This spring clip is substantially triangular in shape and is formed of a single piece of sheet material. The spring clip consists of a bottom portion 10 which is preferably rounded as at 11 to accommodate the bottom of the arcuate depression 4. Extending from the bottom portion are two side portions 12 and 13, which portions are adapted to contact in their normal position as at 14, where the ends of the same are rounded as at 15. The side portions 13 are slightly rounded to accommodate the periphery of a rod or support 16.

The spring clip 9 is adapted to be inserted over the arcuate depression and wings and the sides of the same are adapted to be firmly held in place by their resiliency in the cut-out portions 7 and 8. The clip may be inserted over the arcuate depression and wings by turning the same sidewise and spreading the sides slightly. When the clip is inserted over the wings and arcuate depression sidewise, the same may be turned at right angles so that it may snap in position over the support as shown in Fig. 2.

It will be understood that various changes may be made in the details of construction without departing from the spirit and scope of the invention as defined by the appended claims.

I claim:

1. A spring clip comprising in combination a flat portion having an arcuate slot therein adapted to receive a screw to fasten the same to a wall or the like, a supporting portion extending laterally from said flat portion, said supporting portion comprising an arcuate depression and wings having a cut-away portion therein extending laterally from said arcuate depression, and a clip member formed of resilient material and of substantially triangular shape having curved sides adapted to be inserted over said arcuate depression and wings and in said cut-away portions, whereby an article may be held in place resting in said arcuate depression and held in place by a pair of said rounded sides.

2. In combination with a support, a two-part spring clip, said clip comprising a supporting member having an arcuate depression adapted to form a supporting surface thereon, wings extending laterally from said arcuate depression, and a substantially triangular shaped spring clip adapted to be inserted completely over said wings and arcuate depression.

3. A spring clip comprising in combination a flat portion having an arcuate slot therein adapted to receive a screw to fasten the same to a wall or the like, a supporting portion extending laterally from said flat portion, said supporting portion comprising an arcuate depression and side wings, and a clip member formed of resilient material and substantially triangular in shape, adapted to be inserted completely over said arcuate depression and wings, to have frictional engagement with said wings, whereby an article may be held in place resting in said arcuate depression by said triangular clip member.

In testimony whereof I have signed my name to this specification.

LYLE MALLETTE.